March 11, 1958  R. G. HENIKA ET AL  2,826,571
PROTEIN PRODUCT AND PROCESS
Filed Jan. 11, 1954  2 Sheets-Sheet 2
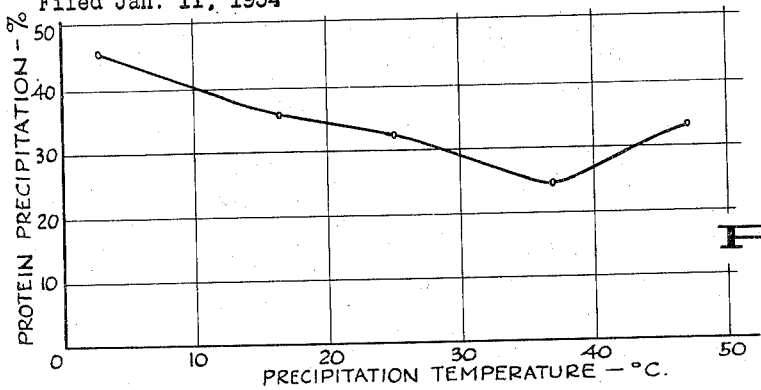
FIG_3_
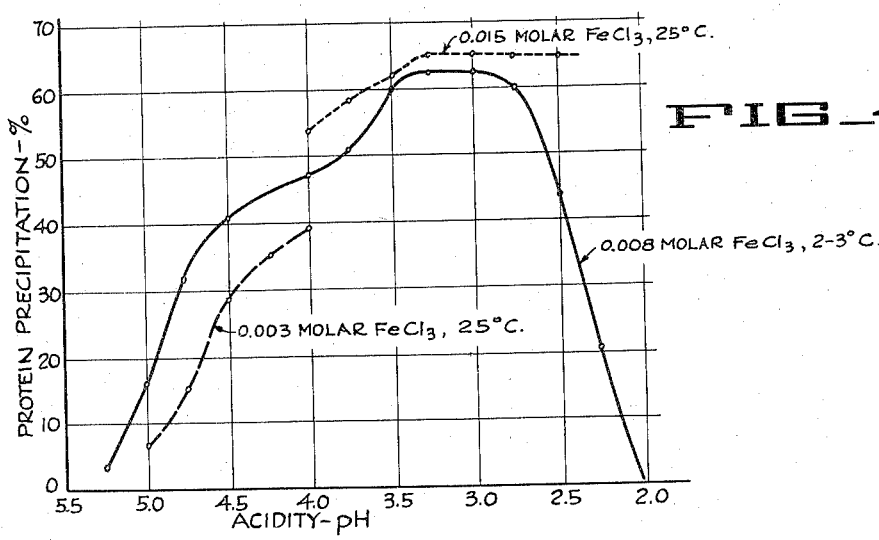
FIG_4_
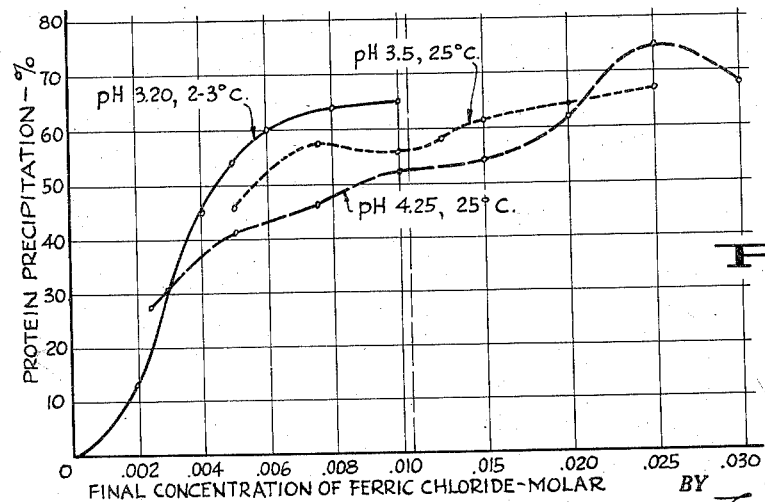
FIG_5_
INVENTORS
RICHARD G. HENIKA
NELSON E. RODGERS
RAYMOND E. MIERSCH
BY
ATTORNEYS ited States Patent Office 2,826,571
Patented Mar. 11, 1958

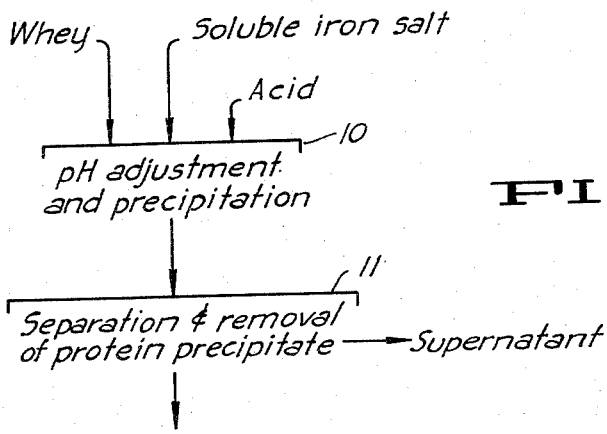
FIG_1_
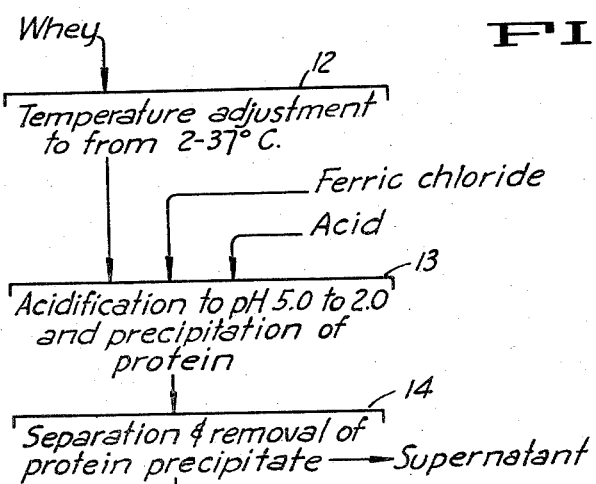
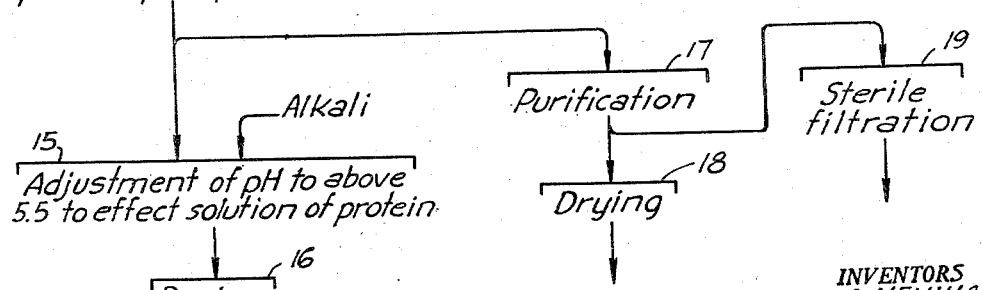
FIG_2_

2,826,571

PROTEIN PRODUCT AND PROCESS

Richard G. Henika and Nelson E. Rodgers, Appleton, and Raymond E. Miersch, Kimberly, Wis., assignors, by mesne assignments, to Foremost Dairies, Inc., San Francisco, Calif., a corporation of New York Application January 11, 1954, Serial No. 403,142

13 Claims. (Cl. 260—115)

This invention relates generally to methods for the manufacture of protein products from liquid lacteal materials, such as liquid whey.

In our co-pending application Serial No. 297,462, filed July 7, 1952 (now Patent No. 2,765,232), for "Whipping Products and Process of Manufacture," of which this application is a continuation-in-part, we have disclosed a process involving the use of a soluble iron salt for the precipitation of protein from liquid whey. The process of said application is carried out in such a way that the serum remaining after removal of the protein precipitate is capable of imparting whipping properties to various mixes, comparable to the whipping properties imparted by materials such as fresh egg white and dried egg albumen. It is pointed out, however, that precipitation by use of an iron salt can be carried out at relatively low temperatures and at such pH conditions as to produce a readily soluble form of protein precipitate. We have reference to a protein which can be dissolved in aqueous solutions at a pH less than 7.0, as for example from 5.0 to 6.0, as distinguished from denatured or coagulated proteins which require alkaline solutions for dissolution. The present process is concerned with manufacture of such readily soluble protein products, and in general it is an object of the present invention to provide a novel process for this purpose.

A further object of the invention is to provide a process of the above character which can be applied to produce a relatively pure form of protein which is readily soluble.

Another object of the invention is to provide a novel protein product having properties potentially suitable as a blood plasma extender.

Additional objects and features of the present invention will appear from the following description in which the preferred embodiments of the invention have been set forth in detail in conjunction with the accompanying drawing:

Referring to the drawing:

Figure 1 is a general flow sheet illustrating the present process.

Figure 2 is a more specific flow sheet for the manufacture of our readily soluble protein.

Figures 3, 4 and 5 are graphs to illustrate the data in Tables 1, 2 and 3.

The present process involves precipitation of protein from fresh whey or like lacteal material, by the use of small amounts of an iron salt, under controlled conditions as to temperature and pH, to provide a readily soluble protein product. Particularly the desired characteristics of the protein are obtained by carrying out the reaction at a temperature of the order of from zero to 60° C.

Where the purity of the protein is not a serious factor, the precipitated protein can be removed from the serum by any suitable procedures, such as settlement and decantation, centrifuging or filtration, after which it can be dried as by vacuum evaporation or spray drying. Such a dried product contains some lactose from the original whey, together with some iron which may be present in the form of a ferri-protein complex.

In instances where it is desired to produce a relatively pure protein, various purification procedures can be applied to the precipitate, depending upon the extent to which it is desired to remove contaminants.

A characteristic of our protein product is that it does not require use of alkaline solutions for its solution. For example, it readily dissolves in aqueous solutions at pH 5.5 and above.

The procedure outlined above has been generally illustrated in Figure 1. In step 10 whey is treated with a small amount of a soluble iron salt such as ferric chloride ($FeCl_3$) and adjusted to pH 2.0 to 5.25 to effect precipitation of protein. Precipitation is carried out within the temperature range of zero to 60° C. The amount of whey protein precipitated in this manner is dependent upon several factors, as will be presently explained. In step 11 the precipitated protein is removed by settlement and decantation, and thereafter can be subjected to further processing, such as spray or vacuum drying, or washing or other purification procedure, followed by drying.

In accordance with the more specific procedure shown in Figure 2, the incoming raw liquid whey is assumed to have a pH of the order of 6.2 to 6.3. In step 12 the temperature of the whey is adjusted to a value within the range of zero to 60° C. In step 13 a small amount of ferric chloride is added followed by adjustment of the pH in the range 2.0 to 5.25 with a suitable acid to effect precipitation of whey protein. In step 14 the precipitated protein is removed as by settlement and decantation. In step 15 the protein precipitate is dissolved in water by adjusting the pH to above 5.5, preferably in the range pH 6.0 to 7.5, by the addition of an alkali such as sodium hydroxide. Assuming that some of the product to be made does not require further purification, the precipitate is subjected to spray or vacuum drying 16 to produce a final dry product. When it is desired to produce a purer product, the precipitate is subjected to one or more purification operations 17, as will be presently explained, followed by drying 18. As indicated, the solution of refined protein may be sterilized by filtration 19 to provide a preserved solution for pharmaceutical use.

The whey employed for the process as outlined in Figure 2 should be of good edible quality, such as is produced from the manufacture of cheese or casein. In practice edible quality sweet cheddar cheese whey, from which the whey cream has been removed centrifugally has given good results. Ordinarily such whey has a pH of 6.2 to 6.3, and a nitrogen content of 0.13 to 0.14 percent (0.81 to 0.88% protein, N×6.25).

Any suitable acid can be used for adjusting the pH in operation 13, which is compatible with the characteristics desired in the final product. An inorganic acid like sulphuric or phosphoric has been used with good results. Lactic acid is also suitable and can be added or developed by fermentation. Also, we can use such acids as hydrochloric, citric or acetic.

Various soluble non-toxic ferric or ferrous salts can be used, although ferric chloride is preferable. The settling rate of the precipitate is dependent upon various factors of the process, including the temperature at the time of precipitation, the pH, and the concentration of ferric chloride. In general, however, reasonably effective removal of serum by decantation can be established by providing settlement over a period of the order of 16 to 24 hours, after which the supernatant serum may be withdrawn by decantation. Other separation methods such as centrifugation or filtration may be used.

All processing of the precipitate, and particularly vacuum or spray drying, should be carried out without subjecting the material to temperatures such as might cause a substantial amount of heat coagulation or denaturing.

For commercial applications where the protein need not be highly purified, purification at 17 may be carried out by repeated washings with water, the water being acidified to provide a pH of the order of from 3.5 to 4.0, to avoid loss of protein by dissolution. Removal of the protein from the wash water can be effected by known methods such as by decantation, centrifuging or filtration.

Another purification procedure which can be employed is to dissolve the precipitate in water by addition of alkali to pH 5.5 or above, followed by acidulation to pH 2.5 to 4.0 to reprecipitate. The resulting precipitate is then removed by known methods such as decantation or centrifuging. Successive dissolving and precipitation can be carried out as desired.

Another purification procedure which can be employed is to subject the precipitate to dialysis against a stream of water, making use of a suitable membrane. Dialysis is accompanied by a rise in pH. Also dialysis can be applied to a solution of the protein in water, with the pH adjusted to a value of the order of 5.5 to 7.0. It is desirable that the temperature of the dialysis be maintained relatively low, as for example from 2 to 11° C.

Some specific examples of our process are as follows:

EXAMPLE 1

Crude protein product

Six liters of fresh cheddar cheese whey were chilled to 2° C. and ferric chloride added to a final concentration of .008 molar. Sulphuric acid was added to pH 3.5 and, after settling the protein at 2° C. for 18 hours, 60 volume percent of clear supernatant serum was decanted. Sixty percent of the protein was precipitated. On a dry basis the protein precipitate contained 24 percent protein (N×6.25), 68 percent lactose, 7 percent ash and 1 percent other constituents. The untreated whey contained 12 percent protein, 76 percent lactose, 8 percent ash and 4 percent other constituents. The precipitate was dissolved by adding 0.1 normal sodium hydroxide to pH 6.0.

EXAMPLE 2

Purified protein product

Ferric chloride was added to 40 liters of fresh whey at room temperature to give a final concentration of 0.004 molar and the acidity adjusted to pH 4.0 with lactic acid. After settling the protein at about 5° C. for 15 hours, 58 volume percent of supernatant was decanted. Forty-five percent of the protein was precipitated. The protein precipitate was collected as a cake in a Sharples supercentrifuge and divided in half. One half was purified by washing and centrifuging and the other by dissolving the residue, reprecipitating and centrifuging.

Forty liters of cold tap water was added to the first half of the precipitate and readjusted to pH 4.0 with lactic acid. After settling the precipitate at about 5° C. for 16 hours, the supernatant was decanted and discarded. The precipitate was centrifuged, resuspended in 38 liters of distilled water and centrifuged again. The final residue was diluted with 3 liters of distilled water, dissolved by adjusting to pH 6.2 with dilute sodium hydroxide and dried. The product analyzed: moisture—5.2 percent, protein—78 percent, and ash—9.1 percent.

The other half was dissolved in 40 liters of cold tap water by adjusting to pH 6.5 with sodium hydroxide. After an hour, the protein was reprecipitated by adding lactic acid to pH 4.0 and refrigerated overnight. After decanting the supernatant, the precipitate was centrifuged. The precipitate was dissolved, precipitated and centrifuged twice again. The final protein residue was dissolved by adding 3 liters of distilled water and sodium hydroxide to pH 6.2 and the solution dried. The moisture was 3.8 percent, protein—70.5 percent and ash—8.7 percent.

EXAMPLE 3

Purified protein tested for toxic and serological properties

Ferric chloride was added to 27 liters of fresh whey to a concentration of 0.005 molar and adjusted to pH 3.5 with sulphuric acid. The sample was refrigerated at 2° C. while settling the precipitate for 15 hours, after which the supernatant (57 volume percent of sample) was discarded. Fifty percent of the nitrogen was precipitated.

The precipitate was brought to a volume of 40 liters with cold water. The protein was dissolved with sodium hydroxide at pH 6.2, precipitated again by lowering the pH to 3.5 with sulphuric acid and cooling to 2° C. This decantation, suspension, solution and reprecipitation process was repeated four times. The decanted washings were 66, 56, 57, 64, and 67 volume percent respectively. The refined precipitate assayed 66.8 percent protein (N×6.25), 11.9 percent ash, 6.2 percent fat and 0 percent lactose on a dry basis.

The precipitate was dialysed in Visking cellophane tubing against 11° C. running water for 5 days. The pH rose from 4.0 to 5.8. Solution of the protein was completed by adjusting to pH 6.2 and the protein was concentrated to about 7 percent solids in vacuo. The solids concentration was adjusted to 6.5 percent, the pH to 7.4 and the solution filtered aseptically through a Seitz filter. This product assayed 73.5 percent protein, 8.9 percent ash, 5.2 percent fat and 0 percent lactose on a dry basis.

Twenty ml. of the sterile protein solution was injected into the median vein of the fore leg of a 25 kg. dog. This amount represented about 2 percent of the blood volume. A second injection was made one week later. The absence of typical shock reactions (nauseau, defecation, change in respiration rate and temperature, etc.) indicated that the protein product was not toxic and was serologically compatible within the period tested.

Our process, and the character of the product obtained, is affected by such factors as the temperature of the material during precipitation, the initial acidity of the whey, and the concentration of ferric chloride. Laboratory data with respect to the influence of different precipitation temperatures is tabulated in the following table.

TABLE NO. 1

| Precipitation temperature, °C. | Decantation yield—20 hours, Volume percent | Protein Precipitated from serum, percent |
| --- | --- | --- |
| 2–3 | 74 | 46 |
| 15–17 | | 36 |
| 24–26 | 85 | 32 |
| 37–38 | 97 | 25 |
| 46–47 | 90 | 33 |

In carrying out the laboratory work tabulated in Table No. 1, we employed six liter aliquots of a batch of fresh edible whey. In each instance 0.003 molar ferric chloride was added and the pH adjusted to 4.0 with lactic acid, and the samples held at the temperatures indicated for 20 hours. The decantation yields were measured and the serums were assayed to determine the amount of protein removed.

The curve of Figure 3 has been plotted from the data of Table No. 1, between precipitation temperature and protein removal. It will be noted that within the temperature range of from about 2 to 37° C., the amount of protein precipitated varied inversely with the precipitation temperature.

The laboratory data obtained with respect to the effect of different initial acidities for precipitation, is set forth in the following table.

TABLE NO. 2

| Precipitation temperature, °C. | FeCl₃ concentration, molar | pH | Decant yield, Volume percent | Protein precipitated, percent |
|---|---|---|---|---|
| 25 | 0.003 | 5.0 | 100 | 6 |
|  |  | 4.75 | 85 | 15 |
|  |  | 4.5 | 79 | 29 |
|  |  | 4.25 | 77 | 34 |
|  |  | 4.0 | 75 | 39 |
|  |  | 4.0 | 60 | 55 |
|  |  | 3.75 | 58 | 58 |
|  |  | 3.5 | 58 | 62 |
| 25 | 0.015 | 3.25 | 55 | 65 |
|  |  | 3.0 | 52 | 65 |
|  |  | 2.75 | 52 | 65 |
|  |  | 2.5 | 53 | 65 |
|  |  | 5.25 | ---- | 4 |
|  |  | 5.0 | ---- | 16 |
|  |  | 4.75 | ---- | 32 |
|  |  | 4.5 | ---- | 41 |
|  |  | 4.25 | ---- | 45 |
|  |  | 4.0 | ---- | 47 |
| 2–3 | 0.008 | 3.75 | ---- | 51 |
|  |  | 3.5 | ---- | 60 |
|  |  | 3.25 | ---- | 62 |
|  |  | 3.0 | ---- | 62 |
|  |  | 2.75 | ---- | 60 |
|  |  | 2.5 | ---- | 43 |
|  |  | 2.25 | ---- | 24 |
|  |  | 2.0 | ---- | 0 |

Data from the above Table No. 2 are graphed in Figure 4.

The procedures employed for obtaining the data of Table No. 2 were substantially the same as for Table No. 1, except for the different ferric chloride concentrations and temperatures indicated.

As will be evident from Table No. 2, and Figure 4, outside of the pH range of 2.0 to 5.3 the ferric chloride does not result in any substantial precipitation of protein. However, within this range, the amount of protein precipitated varies with temperature, concentration of ferric chloride, and particularly with pH.

The laboratory data obtained with respect to the influence of concentration of ferric chloride upon the process, has been tabulated in the following table.

TABLE NO. 3

| Precipitation temperature, °C. | FeCl₃ concentration, molar | pH | Decant yield, Volume percent | Protein precipitated, percent |
|---|---|---|---|---|
| 25 | .0025 | 4.25 | 78 | 28 |
|  | .005 |  | 71 | 41 |
|  | .0075 |  | 71 | 46 |
|  | .010 |  | 64 | 52 |
|  | .015 |  | 41 | 54 |
|  | .020 |  | 32 | 62 |
|  | .025 |  | 32 | 75 |
|  | .030 |  | 36 | 68 |
| 25 | .005 | 3.5 | ---- | 46 |
|  | .0075 |  | ---- | 57 |
|  | .010 |  | ---- | 55 |
|  | .0125 |  | ---- | 58 |
|  | .015 |  | ---- | 61 |
|  | .020 |  | ---- | 64 |
|  | .025 |  | ---- | 67 |
|  | .0 |  | ---- | 0 |
|  | .002 |  | ---- | 13 |
|  | .003 |  | ---- | 31 |
| 2–3 | .004 | 3.20 | ---- | 45 |
|  | .005 |  | ---- | 54 |
|  | .006 |  | ---- | 60 |
|  | .008 |  | ---- | 64 |
|  | .010 |  | ---- | 65 |

The data in Table No. 3 has been graphed in Figure 5. This data was derived in the same manner as for Table No. 1, except for the deviations noted. At 25° C. the amount of ferric chloride necessary to precipitate over 65% of the whey protein is about 0.025 molar. However, the same amount of protein was precipitated by about ⅓ this amount of ferric chloride, with the pH at 3.2 and the reaction carried out at 2–3° C.

When it is desired to carry out the process to precipitate more than 50% of the whey protein, as for example from 60 to 65%, Tables Nos. 1 to 3 inclusive demonstrate the desirability of precipitating by the addition of ferric chloride to concentrations of the order of from 0.004 to 0.008 molar, adjustment of the initial pH to 3.0 to 3.2, and the reaction being carried out at a low temperature of from 2 to 3° C. In general, however, the iron concentration can vary from 0.001 to 0.030 molar, with from 0.004 to 0.010 molar being preferred, and 0.006 to 0.008 molar deemed most efficient. Similarly, pH at the time of reaction may range from 5.3 to 2.2, from 4.5 to 2.5 being preferred, and from 3.5 to 2.7 being deemed optimum. Likewise the temperature of the reaction may range from 0 to 60° C., from 0° to 25° C. being preferred, and from 2 to 10° C. being deemed optimum.

In some instances the amount of iron contamination in the final product may be important, and it may be desirable to maintain the iron content below specified limits. The amount of iron which is brought down with the precipitated protein varies somewhat with acidity and the ferric chloride concentration, but in general the amount of iron brought down is dependent primarily upon the amount of protein precipitated. The iron content of the protein, after application of purification procedures as previously described, may for example range from 0.2 to 0.4%. This amount of iron gives the dried product a light brown appearance, and imparts a light brown color to a 6% solution of the product.

Laboratory tests have shown that the iron content can be reduced by the addition of a suitable reducing agent, such as hydrosulfite, followed by dialysis. Best results have been obtained by dialysis at reduced pH, as for example from 5.0 to 1.6. It is also possible to use O-phenanthroline or other iron complexing agents, either by itself, or in conjunction with hydrosulfite. Better than 90% of the iron content of the protein has been removed by introduction of small amounts of both hydrosulfite and O-phenanthroline, followed by dialysis.

Because, in the absence of a reducing agent, the iron content of the protein cannot be reduced beyond certain limits by simple dialysis, we believe that the iron is combined with the protein as ferri-protein complexes.

In general our process makes possible the production of a readily soluble form of protein, which can be dissolved and reprecipitated at pH values well below 7.0, and which can be purified as desired to reduce the content of lactose and like soluble ingredients. Thus a wide variety of products can be made which are useable for a wide variety of applications, including food products, drugs, pharmaceuticals, and the like.

We claim:

1. A process for the manufacture of a milk protein from a liquid whey that has its protein in undenatured form comprising precipitating protein from such liquid whey while at a temperature of from 0° to 60° C., while at an acidity of from pH 2.2 to 5.3, and in the presence of small amounts of a nontoxic iron salt providing soluble iron in 0.001 to 0.030 molar concentration, and then removing the precipitated protein from the serum.

2. In a process for the manufacture of a milk protein from a liquid whey that has its protein in undenatured form comprising precipitating protein from liquid whey at a temperature of from 0° to 60° C., at an acidity of from pH 2.2 to 5.3, and in the presence of ferric chloride in concentrations ranging from about 0.001 to 0.030 molar.

3. A process as in claim 2 in which the temperature range is from 0 to 25° C., the pH range from 2.5 to 4.5 and the concentration of ferric chloride from 0.004 to 0.010 molar.

4. A process as in claim 2 in which the temperature range is from 2 to 10° C., the pH range from 2.7 to 3.5, and the concentration of ferric chloride from 0.006 to 0.008 molar.

5. A process as in claim 1 in which the precipitated protein is purified by washing after removal of serum from the same.

6. A process as in claim 1 in which the precipitated protein is purified by dissolving in water at above pH 5.5 followed by reprecipitation with acid at pH 2.5 to 4.5.

7. A process as in claim 1 in which the iron content of the precipitated protein is reduced by addition of a reducing agent followed by dialysis.

8. A process as in claim 1 in which the iron content of the precipitated protein is reduced by addition of a dialysable iron complexing agent followed by dialysis.

9. A process as in claim 1 in which the protein precipitant is solubilized by adjusting the pH of an aqueous dispersion of the same to above pH 5.5.

10. A protein product produced by the process of claim 1, characterized in that it is potentially soluble below pH 7.0.

11. A protein product produced by the process of claim 5, characterized in that it is potentially soluble below pH 7.0 and having an iron content of from 0.2 to 0.4%.

12. The milk protein product produced by precipitating the protein of whey after removal of casein, with ferric chloride at a pH of 3–4.5 at ordinary temperatures.

13. The milk protein product produced by precipitating the protein of whey with ferric chloride at a pH of 2.2 to 5.3 at a temperature of from 0 to 60° C.

References Cited in the file of this patent
UNITED STATES PATENTS

| | | |
|---|---|---|
| 906,474 | Turner | Dec. 8, 1908 |
| 2,606,181 | Pratt et al. | Aug. 5, 1952 |
| 2,607,766 | Ingle et al. | Aug. 19, 1952 |
| 2,669,559 | Reid | Feb. 16, 1954 |
| 2,710,858 | Block et al. | June 14, 1955 |

FOREIGN PATENTS

| | | |
|---|---|---|
| 806,933 | Germany | June 21, 1951 |

OTHER REFERENCES

Sjostrom: Chem. Abstr., vol. 43, col. 326 (1949).
Blix: Chem. Abstr., vol. 43, col. 3534 (1949).
Anson et al.: "Advances in Protein Chem.," vol. III, pp. 54–5 (1947).